United States Patent Office 3,546,180
Patented Dec. 8, 1970

3,546,180
POLYESTERS CONTAINING DISULFONAMIDO COMPOUNDS HAVING IMPROVED DYEING PROPERTIES
John R. Caldwell and Glenn C. Jones, Kingsport, Tenn., assignors to Eastman Kodak Company, Rochester, N.Y., a corporation of New Jersey
No Drawing. Filed June 25, 1968, Ser. No. 739,652
Int. Cl. C08g *17/08*
U.S. Cl. 260—76      16 Claims

ABSTRACT OF THE DISCLOSURE

Disulfonamido compounds when incorporated into polyester molecules greatly improve the dyeability of the polyester. The disulfonamido compounds are defined as

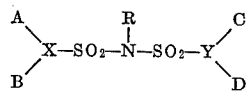

wherein R is —H or an alkali metal, X and Y are the same or different radicals selected from the group consisting of divalent and trivalent arylene radicals of 6 to about 12 carbons and divalent and trivalent alkarylene radicals of 7 to about 18 carbons, said radicals being unsubstituted or substituted with chlorine atoms, A, B, C, and D are the same or different and selected from the group consisting of —H, —COOR'' and

wherein R'' is alkyl of from 1 to about 8 carbons, or aryl of from 6 to about 14 carbons, $R_1$ is alkyl of from 1 to about 8 carbons, and wherein either two or three of A, B, C, and D are —H.

---

This invention relates to polyesters and shaped articles such as fibers and films thereof which are dyeable to deep shades with basic dyes. The dyed articles have excellent fastness to light, laundering and dry cleaning.

Heretofore known polyester modifiers such as disclosed in U.S. Pat. 3,018,272 have salt groups which tend to render the intermediates of the polyesterification reaction insoluble in the reaction system. This results in nonhomogeneous products giving difficulties in spinning such as plugging of the spinneret. Moreover, these polymers have abnormally high melt viscosities leading to processing difficulties such as high spinning temperatures which promote polymer degradation, loss of physical properties and color formation.

Objects, therefore, are: to provide improved polyester articles such as films and fibers that are readily dyeable with basic dyes according to standard procedures, without the processing difficulties encountered in the prior art compositions; and to provide a commercially practicable process for preparing readily dyeable polyester compositions without adversely affecting the polymer.

These and other objects hereinafter appearing have been attained in accordance with the present invention through the discovery of employing as a reactant in a polyesterification reaction from 1.0 to 15.0 mole percent, and preferably from 2.0 to 6.0 mole percent of a compound containing a disulfonamido linkage or a disulfonamido salt group linkage and one or two other groups that participate in the reaction, such as carboxy or caralkoxy. The compounds have the general structure:

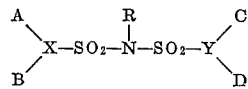

wherein R is —H or an alkali metal, X and Y are the same or different radicals selected from the group consisting of divalent and trivalent arylene radicals of 6 to about 12 carbons and divalent and trivalent alkarylene radicals of 7 to about 18 carbons, said radicals being unsubstituted or substituted with chlorine atoms, A, B, C, and D are the same or different and selected from the group consisting of —H, —COOR'' and

wherein R'' is alkyl of from 1 to about 8 carbons, or aryl of from 6 to about 14 carbons, $R_1$ is alkyl of from 1 to about 8 carbons, and wherein either two or three of A, B, C, and D are —H.

When the disulfonamide compound contains only one of the radicals A, B, C, and D capable of participating in the esterification reaction, it functions as a chain-terminating agent and limits the molecular weight of the polyester. In order to compensate for this, a branching agent that contains three or more esterifiable groups may be employed. It is especially desirable to use a branching agent if more than about 1.5 mole percent of this disulfonamide compound is used, based on the acid component present in the polyester.

It is seen that the present reactants have an acidic hydrogen atom attached to a nitrogen atom whereas the compounds of the prior art have acidic hydrogens attached to oxygen atoms. It is believed that the present reactants are less salt like in nature and are more soluble in the organic media of the polymeric system, thus giving the vastly improved homogeniety. Basic dyes give vivid colors with the present compositions. In masterbatching polyesters containing prior art salts, greater than 10% of the polyesters gives poor flow and blending properties to the blend, whereas with the present reactants about 20% or higher of the modified polyester may be masterbatched without loss of processability of the blend.

In general, any of the film and fiber forming polyesters can be modified according to the present invention. Polyesters made from at least a major portion of terephthalic acid as the acid component, and the polymethylene glycols are especially useful. Cyclic glycols such as 1,4-cyclohexanedimethanol, 2,2,4,4-tetramethyl-1,3-cyclobutanediol, p-xylene glycol and the nonbornanediols can be used. Polyesters prepared from hydroxyacids such as p-(2-hydroxyethoxy) benzoic acid may also be modified. The polyesters include all types of high-melting, crystalline polyesters and copolyesters as well as non-crystalline or slightly crystalline polyesters. These polyesters are prepared by techniques well known to the art by reaction of one or more dicarboxylic acids with one or more dihydric alcohols. The dicarboxylic acid and dihydric alcohol may be reacted in either their esterified or in their unesterified form.

Acids which may be used include the aliphatic dibasic acids or esters thereof of the formula $$R^{10}OOC-R^{11}-COOR^{12}$$

wherein $R^{10}$ and $R^{12}$ are either hydrogen or alkyl radicals containing from 1 to 10 carbon atoms, and $R^{11}$ is an aliphatic hydrocarbon radical. Typical aliphatic dibasic dicarboxylic acids which can be employed include oxalic acid, succinic acid, adipic acid, sebacic acid, $\alpha,\alpha$-dimethyl glutaric acid, dimethyl malonic acid, diglycollic acid, $\beta$-oxydipropionic acid, $\gamma$-oxydibutyric acid, and similar well known aliphatic dibasic acids. The acids of this type which are preferred are those containing at least 6 carbon atoms. The esters of such acids can also be used, and the alkyl esters wherein each alkyl group contains from 1 to 10 carbon atoms are desirably employed.

Aromatic dicarboxylic acids or diesters thereof may be advantageously used. Such acids have the formula  $R^{10}OOCR^{13}-Y-R^{14}COOR^{12}$ wherein $R^{10}$ and $R^{12}$ are the same as defined above and $R^{13}$ and $R^{14}$ each represents $(-CH_2-)_{n-1}$ wherein $n$ has a value of from 1 to 5 inclusive and Y represents a divalent aromatic radical of the formula

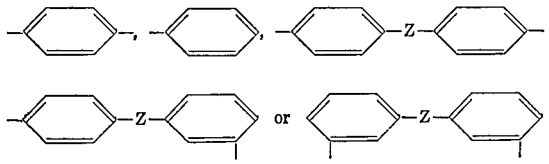

Z representing a radical of the formula $-(CH_2)_{n-1}-$;

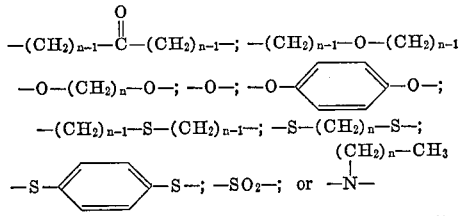

Examples of such acids include p,p'-sulfonyldibenzoic acid, 2,7-naphthalene dicarboxylic acid, terephthalic acid, 1,2 - di(p-carboxyphenoxy)ethane, 1,2-di(p-carboxyphenyl)ethane, 1,2-di(p-carboxyphenoxy)ethane and p,p'-diphenic acid.

The dihydric alcohol, or ester thereof, is preferably of an alpha, omega-dioxy compound having the formula $$HO-(CH_2)_q-OH$$

wherein $q$ is an integer from 2 to 12 inclusive. The polyhydric alcohols which are preferably employed in practicing the invention are the glycols which are commonly used in the preparation of polyesters such as ethylene glycol, trimethylene glycol, tetramethylene glycol, pentamethylene glycol, hexamethylene glycol, heptamethylene glycol, octamethylene glycol, decamethylene glycol and similar well known polymethylene glycols. The branched-chain glycols such as 2-methyl-pentanediol, 3-methyl-hexanediol and alicyclic glycols such as quinitol, norcamphanediols and 1,4-cyclohexanedimethanol can be used. Other glycols which are suitable include 2,2,4,4-tetraalkylcyclobutane-1,3-diols and the ether glycols such as diethylene glycol. The dihydroxy compounds used in practicing this invention need not to be the free hydroxy compounds when a catalyst of the organo-metallic type is employed to promote the polyester formation.

Other examples of dicarboxylic acids or diesters thereof and dihydroxy alcohols and mono- and di-esters thereof, are set forth in U.S. Pat. No. 2,831,831 and in U.S. Pat. No. 2,891,929, the disclosures of which are incorporated herein by reference.

Copolyesters, such as those prepared from terephthalic acid, ethylene glycol and 1,4-cyclohexanedimethanol or from terephthalic acid, isophthalic acid and ethylene glycol, may also be admixed with nonoxygen acids in accordance with the practice of this invention. There may also be employed noncrystalline or slightly crystalline polyesters such as the polycarbonates of bisphenols, the polyterephthalates of bisphenols and the polyisophthalates of bisphenols.

The polyesters employed in the practice of this invention can be prepared in accordance with the well known methods employed for preparing polyesters by reaction of a glycol and a dibasic acid. Thus, they may be prepared, for example, by heating an ester of a dicarboxylic acid and 25 to 100 mole percent excess of glycol in the presence of a suitable condensation catalyst such as an amphoteric metal compound. The condensation reaction can be effected at atmospheric pressure under nitrogen and at a temperature of from about 150 to 300° C.

The polyester may also be prepared by a solid-phase process wherein the initial condensation is carried out under vacuum to form a prepolymer having an inherent viscosity of 0.15 to 0.30. The prepolymer is then solidified, pulverized to a particle size of about 0.01 to 0.03 inch, and the pulverized prepolymer heated under vacuum or in an inert gas stream at 200 to 260° C. until the polymerization has reached the desired stage.

In preparing the linear polyester, catalytic condensing agents, such as esterification catalysts and ester interchange catalysts, which are well known to the art, may be employed. Preferred catalysts are titanium compounds, tin compounds, zinc compounds, antimony compounds or combination thereof. The catalytic condensing agent is generally employed in an amount of from about 0.001% to about 0.1% based on the weight of the materials being condensed. There is nothing critical in the amount or type of catalyst used to effect the condensation.

Especially useful polyesters in the fiber field are those prepared from at least 80 mole percent terephthalic acid or a condensable derivative thereof, and from 0 to 20 mole percent of another dicarboxylic acid, and ethylene glycol.

The disulfonamido containing compounds of the invention are illustrated by the following examples.

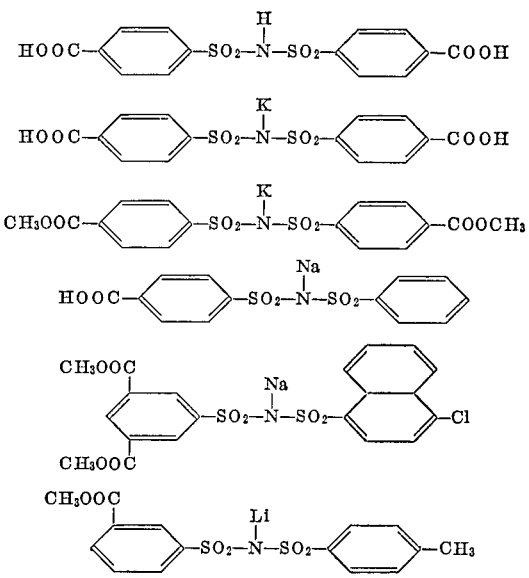

It is well known in the art to prepare di(aryl)sulfonamides by treatment of an aromatic sulfonamide with an aromatic sulfonyl chloride in the presence of an acid acceptor such as an alkali hydroxide [Zhur. Obschei Khim., 29, 3602 (1959)]. [See Chemical Abstracts, 54, 19577.] This method is generally useful in preparing the disulfonamido linkage of the modifiers of the present invention. The carboxy or carbalkoxy groups of the modifiers may be present as substituents on the sulmonamide or sulfonyl chloride before synthesis of the disulfonamido linkage. The carboxy or carbalkoxy groups may also be synthesized however after the disulfonamido linkage by oxidation of an α-hydrogen bearing an alkyl group attached to an aromatic ring. This oxidation may be brought about by several inorganic oxidizing agents such as alkaline potassium permanganate, sodium dichromate, chromium trioxide, dilute nitric acid and the like. The reaction may be carried out in aqueous media or in organic solvents such as acetic acid. The oxidation method is particularly useful when the arylene radicals involved are phenylene. The following general equations illustrate the methods for synthesizing the new polyester modifiers.

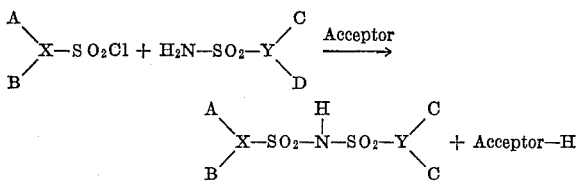

wherein X and Y are the same or different radicals selected from the group consisting of divalent and trivalent arylene radicals of 6 to about 12 carbons and divalent and trivalent alkarylene radicals of 7 to about 18 carbons, said radicals being substituted or unsubstituted with chlorine atoms, A, B, C and D are the same or different and selected from the group consisting of —H, —COOR″ and

wherein R″ is alkyl of from 1 to about 8 carbons, or aryl of from 6 to about 14 carbons, $R_1$ is alkyl of from 1 to about 8 carbons, and wherein either two or three of A, B, C, and D are —H.

The acid acceptor may be an alkali hydroxide or tertiary amine such as pyridine. When one or two of the groups A, B, C or D are alkyl with an alpha-hydrogen the groups may be oxidized to carboxyl groups. Although the modifiers have been illustrated here as fully protonated species, they may also be isolated as a mono-alkali species.

As has been mentioned above, when the modifier is monofunctional it may be advantageous to use a branching agent in the polyesterification reaction. Such branching agents may contain three or more functional groups and they preferably contain three or four functional groups. The reactive groups may be carboxyl or aliphatic hydroxyl. The branching agent may contain both types of groups. Examples of acidic branching agents include trimesic acid, trimellitic acid, pyromellitic acid, butanetetracarboxylic acid, naphthalene tricarboxylic acids and cyclohexane-1,3,5-tricarboxylic acid. Examples of hydroxyl branching agents include glycerin, trimethylolpropane, pentaerythritol, dipentaerythritol, 1,2,6-hexanetriol and 1,3,5-trimethylolbenzene. Examples of hydroxy acids are 2,2-dihydroxymethyl propionic acid; 10,11-dihydroxyundecanoic acid; and 5-(2-hydroxyethoxy)isophthalic acid.

The polyesters are made by standard methods. The preferred method is based on the catalyzed interchange between the carboxylic acid esters and the glycols. When a monofunctional modifier is employed, in order to obtain a high molecular weight, soluble and fusible polyester, a balance between the concentration of the terminating agent and the concentration of the branching agent should be reached. If too much terminating agent is used, the molecular weight of the polyester will be too low and the physical properties will be poor. If too much branching agent is used, the product will be crosslinked and infusible. When the proper ratio of terminating to branching agent is used, the polymer is soluble and fusible. In practice, it has been found that a small amount of cross-linked insoluble polymer can be tolerated, especially if the product is to be used for the production of extruded objects other than fibers. An approximate method for calculating the maximum amount of branching agent is given by the expression $$\frac{\text{moles of terminating agent}}{\text{moles of branching agent (trifunctional)}} = 3$$

For example, if 9 moles of terminating agent is used, about 2.5 to 3.0 moles of trifunctional branching agent is used. If the branching agent contains more than 3 reactive groups, a proportionally smaller amount is used.

In general, the branched polyesters of the invention have a molecular weight of at least 5000 and preferably 8,000 to 30,000. The intrinsic viscosity, as measured in 60 phenol-40-tetrachloroethane, is 0.3 to 1.0. According to the process of the invention, highly branched polyesters that are completely soluble can be prepared. However, as mentioned above, polyesters that contain a small amount of insoluble, cross-linked polymer have utility, especially as films and adhesives. The polyester compositions of the invention may contain up to about 15 mole percent of termination agent and 3–5% trifunctional branching agent. Branching agents containing 4 to 6 reactive groups are used at lower levels and generally in the range of 1 to 2 mole percent. The polyester compositions of the invention may contain up to about 15 mole percent difunctional modifier. Blends of the branched polyesters can be made with various amounts of normal linear polyesters. In certain cases it is advantageous to prepare modified polyesters with 7–10 mole percent modifier and blend them with unmodified polyesters before they are spun into fibers.

Fibers from the modified polyesters of the present invention are readily dyeable to deep shades with basic dyes. Basic dyes that can be used to color the compositions include Sevron Blue B (Color Index No. Basic Blue 21), Sevron Brilliant Red 4G (Color Index No. Basic Red 14), Sevron Green B (Color Index No. Basic Green 3), Sevron Yellow L (Color Index No. Yellow 13), Auramarine SP (Color Index No. Basic Yellow 2), Calcozine Orange RS (Color Index No. Basic Orange 1), Rhodamine 5G (Color Index No. Basic Red 1), Bismark Brown (Color Index No. Basic Brown), and Methyl Violet (Color Index No. Basic Violet 1).

EXAMPLES

Example 1

In general di(aryl)sulfonamides may be prepared in fair to good yields by the method described in Zhur. Obschei Khim., 29, 3602 (1959). Also see Chemical Abstracts, 54, 19577h.

To a stirred solution of 137.0 g. (0.8 mole) of p-toluenesulfonamide and 32.4 g. (0.81 mole) of sodium hydroxide in one liter of water is added 152.5 g. (0.8 mole) of p-toluenesulfonyl chloride. The mixture is refluxed for 4 hours. The reaction medium is maintained slightly basic (pH 7.5–8.0) by addition of sodium hydroxide. The reaction mixture is acidified with concentrated hydrochloric acid. The mixture is then extracted with three 200-ml. portions of benzene. The combined benzene extract is extracted with 10% sodium bicarbonate solution until carbon dioxide evolution ceases. The basic extracts are acidified with concentrated hydrochloric acid and the product filtered. The product is recrystallized from ethyl acetate-hexane twice and ethanol-hexane twice. The dry di-p-toluenesulfonamide weighs 115 g., melts at 169.5–171° C., has a $pK_a$ of 2.86, and an empirical formula of $C_{14}H_{15}O_4NS_2$: C, 51.7; H, 4.7; S, 19.7; neutralization equivalent, 325.4. Analysis gives: C, 51.8; H, 4.8; S, 19.6; neutralization equivalent 325.4.

A mixture of 32.5 g. (0.10 mole) of di-p-toluenesulfonamide, 5.6 g. (0.10 mole) of potassium hydroxide and 63.2 g. (0.40 mole of potassium permanganate in 1 liter of water is refluxed for 2 hours and allowed to stand overnight. The mixture is filtered and acidified with concentrated hydrochloric acid.

The nuclear magnetic resonance spectrum of the product indicates that a small amount of aromatic methyl group remains. The product is redissolved in potassium hydroxide solution and treated with 6.3 g. (0.04 mole) of potassium permanganate. The mixture is filtered; the filtrate is acidified with concentrated hydrochloric acid and the precipitated product filtered. The product has a melting point greater than 300° C. and weighs 32.3 g. A sample of the product is recrystallized from water and washed with acetone. A nuclear magnetic resonance spectrum indicates no aromatic methyl to remain. The spectrum is consistent with that expected for 4,4′-[(potassioimino)disulfonyl]dibenzoic acid, having the empirical formula $C(_{14}H_{10}NO_8S_2K$: C, 39.7; H, 2.4; N, 3.3; S, 15.1; neutralization equivalent, 211.7. Analysis gives: C, 40.1; H, 2.4; N, 3.2; S, 15.4; neutralization equivalent, 213.6.

Example 2

A mixture of 88.3 g. (0.5 mole) of benzenesulfonyl chloride 171.2 g. (1.0 mole) of p-toluenesulfonamide, 40 g. (1.0 mole) of sodium hydroxide, 500 ml. of water, and 875 ml. of benzene is stirred continuously at room temperature for 1 hour, after which an additional 88.3 g. (0.5 mole) benzenesulfonyl chloride in 75 ml. of benzene is added. After an additional 6 hours of stirring, the mixture is made basic with sodium carbonate. The clear layers are separated. The aqueous layer is acidified with concentrated hydrochloric acid. The solid product is filtered and recrystallized several times from ethyl acetate-heptane.

The product is dried under vacuum at 90° C. and weighs 80 g., melts at 168–169° C., and has a $pK_a$ of 2.60. The nuclear magnetic resonance spectrum of the product is consistent with that expected for benzene-p-toluenesulfonamide having the empirical formula $$C_{13}H_{13}NO_4S_2$$

C, 50.1; H, 4.2; S, 20.6; neutralization equivalent, 311.4. Analysis gives C, 50.4; H, 4.2; S, 20.4; neutralization equivalent, 309.0.

A mixture of 31 g. (0.10 mole) of benzene p-toluenesulfonamide, 5.6 g. (0.10 mole) of potassium hydroxide, 32 g. (0.20 mole) of potassium permanganate and one liter of deionized water is stirred and heated at 30–65° C. for 4 hours. Stirring is continued overnight. The reaction mixture is filtered and the filtrate acidified with concentrated hydrochloric acid. The resulting white solid (11 g.) is recrystallized from ethanol-benzene and the inorganic material present removed by filtration. The product melts at 243–246° C. This product's nuclear magnetic resonance and infrared spectra show it to be 4-[(phenylsulfoimino)sulfonyl] benzoic acid. The acidified filtrate is reduced to one-half its volume and cooled. 10.5 g. of a second product is obtained having a melting point >300° C. The nuclear magnetic resonance and infrared spectra of the second product show it to be 4-[[phenylsulfo(potassio)imino]sulfonyl] benzoic acid.

Example 3

Methyl m-chlorosulfonyl chloride melting at 68–69° C. is converted to methyl m-sulfamoylbenzoate melting at 131–133° C. by treatment with ammonium hydroxide solution. This sulfonamide is treated with p-toluenesulfonyl chloride essentially according to the procedure outlined in Example 1 for the preparation of di-p-toluenesulfonamide. Methyl-3-[(4 - methylphenylsulfoimino)sulfonyl] benzoate is obtained in low yield. The lithium salt is obtained by treating an aqueous solution of this material with one equivalent of lithium hydroxide and removal of the water under vacuum. The nuclear magnetic resonance spectrum of this material is consistent with the desired structure.

Example 4

Dimethyl - 5 - [[4-chloro-1-naphthylsulfo(sodioimino]-sulfonyl] isophthalate is prepared from dimethyl 5-chlorosulfonylisophthalate (M.P. 106–107°) essentially as described in Example 3. The product is identified by its nuclear magnetic resonance and infrared spectra.

Example 5

The following materials are placed in a reaction flask equipped with a stirrer, a distillation column, and an inlet for nitrogen:

18.9 g. (0.0975 mole) dimethyl terephthalate
1.1 g. (0.0025 mole) 4,4'-[(potassioimino)disulfonyl] dibenzoic acid
12.4 g. (0.2 mole) ethylene glycol
1 ml. catalyst solution containing 0.7% antimony acetate and 0.16% zinc acetate
0.018 g. titanium tetraisopropoxide The solution is stirred at 195° C. and the methanol removed through the column. 25 g. of ethylene glycol are added and the solution heated one hour longer. The temperature is raised to 275° C. and the stirring continued for 35 min. under a vacuum of about 0.5 mm. Hg. A high viscosity melt is obtained. The polymer has an intrinsic viscosity of 0.59 in a 60/40 mixture of phenol-tetrachloroethane. It is completely soluble, showing that no crosslinking takes place.

Example 6

The following materials are used during this polymer preparation.

36.66 g. (0.189 mole) dimethyl terephthalate
1.16 g. (0.006 mole) dimethyl isophthalate
2.11 g. (0.005 mole) 4,4'[(potassioimino)disulfonyl]dibenzoic acid
24.8 g. (0.4 mole) ethylene glycol
2 ml. catalyst solution containing 0.7% antimony acetate and 0.16% zinc acetate
0.036 g. titanium tetraisopropoxide A polymerization apparatus as described in Example 5 is used.

The modifier is heated with 24.8 g. of ethylene glycol under nitrogen at 195–210° C. for 30 min. The dimethyl terephthalate, dimethyl isophthalate, and catalysts are added and the ester interchange takes place in 35 min. at 195° C. 25 g. of additional ethylene glycol are added and the temperature raised to 220° C. for 25 min. The temperature is raised to 260° C. and the polymer melt stirred under vacuum for 45 min. A high viscosity melt is obtained. The polymer has an intrinsic viscosity of 0.52 in a 60/40 mixture of phenoltetrachloroethane, and is completely soluble.

Monofil of this polymer is extruded at 450° F. and 200 p.s.i. The monofil is drafted over steam and heat-set at 145° C. for 5 min. The fiber is dyed with 3% Eastacryl Blue-5GL with 5 g./liter Latyl Carrier A. The fiber dyes to a deep shade. The dyed fiber's lightfastness is excellent and there is no change in color after 20 hours' exposure in the Fade-Ometer. Poly(ethylene terephthalate) modified with three mole percent of isophthalic acid dyes to a very slight degree under these conditions.

Example 7

A polymerization apparatus as described in Example 5 is used. A mixture of 0.525 g. (0.00125 mole) of 4,4'-[(potassioimino)disulfonyl]dibenzoic acid and 12.4 g. (0.20 mole) of ethylene glycol is heated at 195° C. with stirring under nitrogen atmosphere for about 1.5 hours in 9.45 g. of dimethyl terephthalate (0.04875 mole) and 0.5 ml. of catalyst solution containing 0.7% antimony acetate and 0.16% zinc acetate are added to the solution. The ester interchange is carried out a 195° C. The temperature is raised to 265° C. and the polymer melt stirred under vacuum for 75 min.

The polymer has an intrinsic viscosity of 0.51 in a 60/40 mixture of phenol-tetrachloroethane.

Example 8

A polymer sample of poly(ethylene terephthalate) modified with 2.5 mole percent of 4,4'-[(potassioimino) disulfonyl] dibenzoic acid having an intrinsic viscosity 0.50–0.60 is ground to pass a 3 mm. screen. It is then melt spun, drafted in steam about 350% and heatset at 145° C. The drafted yarn is knitted into a tube. A 3% dyeing of Basacryl Red-GL with 5 g./liter Latyl Carrier A on the sock for one hour at the boil gives a deep shade of dyeing. The dyed sock appears lightfast after 20 hours in the Fade-Ometer. A 3% dyeing with Eastacryl Blue-5GL was found to give similar results.

Example 9

The following materials are placed in a reaction flask equipped as described in Example 5.

| | G. |
|---|---|
| Dimethyl terephthalate (0.2925 mole) | 56.7 |
| 4,4'-[(potassioimino)disulfonyl]dibenzoic acid (0.05150 mole) | 21.8 |
| Ethylene glycol (0.60 mole) | 37.2 |
| Zinc acetate | 0.013 |

The solution (mixture) is stirred for 90 min. at 190–200° C. and the methanol is removed through the column. The temperature is raised to 255° C. and the stirring continued for 50 min. under a vacuum of about 0.2 mm. Hg. A high viscosity melt is obtained. The polymer has an intrinsic viscosity of 0.51 in a 60/40 mixture of phenol-tetrachloroethane.

This polymer is ground to pass a 2 mm. screen and is roll blended with three parts by weight of poly(ethylene terephthalate) having an inherent viscosity of 0.69, which has also been ground to pass a 2 mm. screen. This polymer blend is melt spun and a knit tube is prepared from the spun fibers. Three percent dyeings of Sevron Yellow L and Eastacryl Blue 5GL on these knit tubes produce deep shades of the basic dyes. The lightfastness is excellent and there is no change in color after 20 hours' exposure in the Fade-Ometer.

Example 10

The following materials are placed in a reaction flask equipped as described in Example 5.

| | G. |
|---|---|
| Dimethyl terephthalate (0.0975 mole) | 18.92 |
| 4-[[phenylsulfo(potassio)imino]sulfonyl] benzoic acid (0.0025 mole) | 0.95 |
| Ethylene glycol (0.20 mole) | 12.4 |
| Zinc acetate | 0.0043 |
| Antimony acetate | 0.009 |
| Trimethylol propane | 0.067 |

The solution is stirred for 60 min. at 195° C. and the methanol removed through the column. The temperature is then raised to 275° C. and the stirring continued for 90 min. under a vacuum of about 0.1 mm. Hg. A high melt viscosity polymer is obtained. The polymer has an inherent viscosity of 0.48 in a 60/40 mixture of phenol-tetrachloroethane. The polymer is completely soluble.

This polymer is melt spun, drafted in steam about 350% and heat-set at 145° C. The drafted yarn is knitted into a tube. The tube is dyed to deep shades with basic dyes Sevron Green B and Calcozine Orange RS in 3% dyeings using 5 g./liter Latyl Carrier A. The dyed sock appears lightfast after 20 hours' exposure in the Fade-Ometer.

Example 11

Polyesters containing aromatic disulfonamide and disulfonamido salt terminating agents are shown in (a) through (c) below.

(a) Polymer of I.V.=0.61 prepared from terephthalic acid, 1,4-cyclohexanedimethanol, 2.0 mole percent of

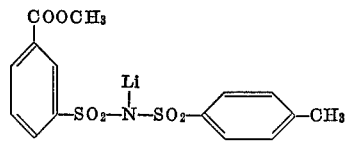

and 0.7 mole percent of trimesic acid.

(b) Polymer of I.V.=0.37 prepared from p-(2-hydroxyethoxy)benzoic acid and 1.5 mole percent of

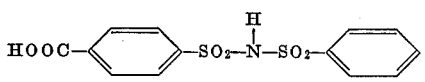

with no branching agent.

(c) Polymer of I.V.=0.53 prepared from naphthalene-2,6-dicarboxylic acid, 1,3-propanediol, 8.0 mole percent of

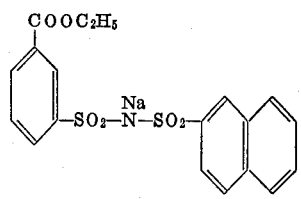

and 2.3 mole percent of glycerine.

Example 12

Example 5 is repeated using 0.0025 mole of (I) below instead of 0.0025 mole of 4,4'-[(potassioimino)-disulfonyl] dibenzoic acid. The polymer obtained has an intrinsic viscosity of 0.47 in a 60/40 mixture of phenol-tetrachloroethane. It is completely soluble.

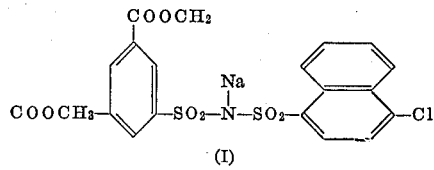

(I)

A monofil of this polymer is extruded, drafted over steam and heat-set at 145° for 5 min. Three percent dyeings with Eastacryl Blue-5GL gives a deep shade of the basic dye.

The invention has been described in detail with particular reference to preferred embodiments thereof, but it will be understood that variations and modifications can be effected within the spirit and scope of the invention as described hereinabove and as defined in the appended claims.

We claim:
1. A high molecular weight polyester of
   (1) at least one dibasic carboxylic acid,
   (2) at least one dihydric alcohol and
   (3) from 1.0 to 15.0 mole percent of an organic compound having the structural formula:

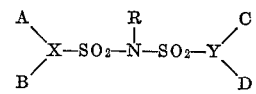

wherein
   (a) R is selected from the group consisting of —H and an alkali metal,
   (b) X and Y are the same or different radicals selected from the group consisting of divalent and trivalent arylene radicals of 6 to about 12 carbons and divalent and trivalent alkarylene radicals of 7 to about 18 carbons, said radicals being unsubstituted or substituted with chlorine atoms, and
   (c) A, B, C, and D are the same or different and are selected from the group consisting of

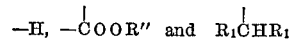

wherein
   R″ is selected from the group consisting of —H, alkyl of from 1 to about 8 carbons and aryl of from 6 to about 14 carbons, $R_1$ is alkyl of from 1 to about 8 carbons, and either two or three of A, B, C, and D are —H, said polyester having an intrinsic viscosity of at least 0.3 as measured in a 60/40 mixture of phenol-tetrachloroethane.

2. The polyester of claim 1 wherein (1) is terephthalic acid, and (2) is a polymethylene glycol.
3. The polyester of claim 1 wherein (1) is terephthalic acid and (2) is 1,4-cyclohexanedimethanol.
4. The polyester of claim 1 wherein two of A, B, C and D are —H.

5. The polyester of claim 1 wherein three of A, B, C, and D are —H.

6. The polyester of claim 1 wherein (3) is 4,4'-[(potassioimino)disulfonyl] dibenzoic acid.

7. The polyester of claim 1 wherein (3) is 4-[[phenylsulfo(potassio)imino]sulfonyl] benzoic acid.

8. The polyester of claim 1 wherein (1) is a mixture of terephthalic acid and isophthalic acid, (2) is ethylene glycol, and (3) is 4,4'-[(potassioimino)disulfonyl]dibenzoic acid.

9. The polyester of claim 1 wherein the concentration of (3) is 2 to 6 mole percent.

10. The polyester of claim 1 wherein (3) is methyl-3-[(4-methylphenylsulfoimino)sulfonyl]benzoate.

11. The polyester of claim 1 wherein (1) is terephthalic acid, (2) is ethylene glycol, and (3) is 4,4'-[(potassioimino)disulfonyl]dibenzoic acid.

12. The polyester of claim 1 wherein (1) is terephthalic acid (2) is ethylene glycol, and (3) is 4-[[phenylsulfo(potassio)imino]-sulfonyl] benzoic acid.

13. The polyester of claim 1 wherein R is an alkali metal ion.

14. A fiber of the polyester of claim 1.

15. The polyester of claim 1 wherein (1) comprises at least 80 mole percent terephthalic acid and up to 20 mole percent of another dicarboxylic acid, and (2) is ethylene glycol.

16. A fiber of the polyester of claim 15.

References Cited
UNITED STATES PATENTS

| | | | |
|---|---|---|---|
| 2,925,404 | 2/1960 | Caldwell et al. | 260—49 |
| 3,008,928 | 11/1961 | Rueggeberg | 260—75(S) |

WILLIAM H. SHORT, Primary Examiner

L. P. QUAST, Assistant Examiner

U.S. Cl. X.R.

8—4, 179; 260—33.4, 33.8, 49, 75, 470, 515